(No Model.)

R. L. PEABODY.
LATHE.

No. 308,924. Patented Dec. 9, 1884.

Witnesses.
S. N. Piper
E. D. Pratt.

Inventor.
Roswell Loomis Peabody.
by R. H. Eddy atty.

UNITED STATES PATENT OFFICE.

ROSWELL LOOMIS PEABODY, OF WALTHAM, MASSACHUSETTS.

LATHE.

SPECIFICATION forming part of Letters Patent No. 308,924, dated December 9, 1884.

Application filed January 21, 1884. (No model.)

*To all whom it may concern:*

Be it known that I, ROSWELL LOOMIS PEABODY, of Waltham, in the county of Middlesex, of the Commonwealth of Massachusetts, have invented a new and useful Improvement in Lathes; and I do hereby declare the same to be described in the following specification and represented in the accompanying drawings, of which—

Figure 1:
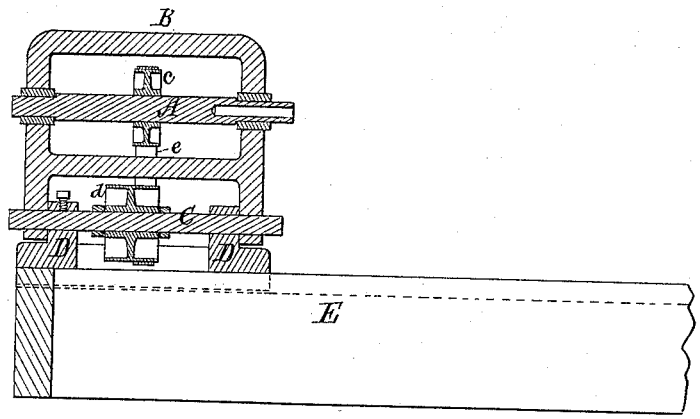

Figure 1 is a longitudinal section; and Fig. 2, an inner end elevation, of a lathe head-stock provided with my invention, the nature of which is defined in the claim hereinafter presented.

My improvement is to enable the arbor of the head-stock to be reciprocated, swung, or moved laterally as well as revolved, such being useful for grinding or various other purposes.

In the drawings, A denotes a lathe arbor supported in a head-stock, B, which is pivoted on a cylindrical rod, C, duly extending horizontally through and fixed in pedestals D, supported in the lathe-bed E.

Figure 2:
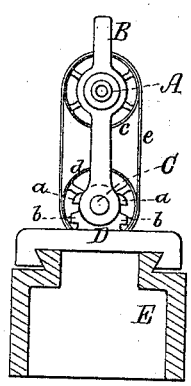

From the above it will be seen that the head-stock with the arbor can be reciprocated or swung laterally, the extent of such movement being determined by suitable means, or ears $a\ a$, projecting from the head-stock, and ears $b\ b$, projecting from the pedestal, as shown in Fig. 2. The arbor has fixed on it a pulley, $c$, to which and another pulley, $d$, revoluble on the rod C, an endless belt, $e$, is applied, the pulley $d$ being wide enough to receive a driving-belt.

From the above it will be seen that the arbor of the lathe head-stock may not only be revolved, but while in revolution may be moved laterally a short distance each way beyond a vertical plane passing longitudinally through the axis of the rod C.

There are other ways in which the head-stock or device for supporting the lathe-arbor may be adapted so as to be capable of being reciprocated laterally while the arbor may be in revolution. I therefore do not confine my invention to the precise way shown and described.

I claim—

The combination of the pedestals D, supported on the lathe-bed E, and provided with the rod C, as explained, with the lathe-arbor head-stock B, pivoted on said rod, and with mechanism — viz., the pulleys and endless band—for revolving the arbor, all being essentially as set forth, and being to enable the arbor to be revolved, and while revolving to be moved or reciprocated laterally of it, as explained.

ROSWELL LOOMIS PEABODY.

Witnesses:
R. H. EDDY,
E. B. PRATT.